United States Patent
Enguehard et al.

(10) Patent No.: US 10,901,781 B2
(45) Date of Patent: Jan. 26, 2021

(54) SYSTEM AND METHOD FOR MIGRATING A LIVE STATEFUL CONTAINER

(71) Applicant: Cisco Technology, Inc., San Jose, CA (US)

(72) Inventors: Marcel Paul Sosthéne Enguehard, Paris (FR); Yoann Desmouceaux, Paris (FR); Jordan Augé, Saint-Cyr-l'ecole (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 187 days.

(21) Appl. No.: 16/130,824

(22) Filed: Sep. 13, 2018

(65) Prior Publication Data

US 2020/0089526 A1   Mar. 19, 2020

(51) Int. Cl.
  *G06F 9/48* (2006.01)
  *G06F 9/455* (2018.01)
  *G06F 9/50* (2006.01)

(52) U.S. Cl.
  CPC ........ *G06F 9/4856* (2013.01); *G06F 9/45558* (2013.01); *G06F 9/5088* (2013.01); *G06F 2009/45575* (2013.01)

(58) Field of Classification Search
  CPC .......... G06F 2009/4557; G06F 9/4856; G06F 11/203; G06F 11/3006; G06F 2009/45575; G06F 9/544; G06F 9/4558; G06F 9/5088
  See application file for complete search history.

(56) References Cited

U.S. PATENT DOCUMENTS

| | | | |
|---|---|---|---|
| 8,830,870 B2 | 9/2014 | Cardona et al. | |
| 9,477,506 B2 | 10/2016 | Wang et al. | |
| 9,588,807 B2 | 3/2017 | Alanis et al. | |
| 10,198,299 B1* | 2/2019 | Xu | G06F 13/28 |
| 10,218,602 B2* | 2/2019 | Levy-Abegnoli | H04L 45/16 |
| 10,261,874 B2* | 4/2019 | Bryant | G06F 11/203 |
| 2014/0047201 A1* | 2/2014 | Mehta | G06F 3/0631 |
| | | | 711/158 |
| 2016/0188378 A1 | 6/2016 | Chao et al. | |
| 2016/0255543 A1* | 9/2016 | Yadhav | H04L 67/148 |
| | | | 370/331 |
| 2017/0003990 A1* | 1/2017 | Dow | G06F 9/45558 |
| 2017/0034041 A1* | 2/2017 | Carofiglio | H04L 45/122 |
| 2017/0034055 A1 | 2/2017 | Ravindran et al. | |
| 2017/0220394 A1* | 8/2017 | Shim | H04W 4/029 |

(Continued)

OTHER PUBLICATIONS

International Search Report and Written Opinion from the International Searching Authority, dated Nov. 13, 2019, 11 pages, for corresponding International Patent Application No. PCT/US2019/050031.

*Primary Examiner* — Dong U Kim
(74) *Attorney, Agent, or Firm* — Polsinelli PC

(57) ABSTRACT

Systems, methods, and computer-readable media for migrating an application container between nodes in a network are disclosed. An interest for an application container may be received by an origin node and, in response, the origin node may transfer a copy of the application container over the network and to a destination node. The origin node can then shut down the application container and transmit any remaining container state and received requests to the destination node. The destination node may then update a routing plane for the network to provide delivery of service requests to the migrated application.

20 Claims, 6 Drawing Sheets

(56) References Cited

U.S. PATENT DOCUMENTS

| | | | |
|---|---|---|---|
| 2017/0353903 A1* | 12/2017 | Rost | H04W 88/04 |
| 2018/0074748 A1 | 3/2018 | Makin et al. | |
| 2018/0124210 A1 | 5/2018 | Mosko | |
| 2018/0181422 A1* | 6/2018 | Lee | G06F 9/45533 |
| 2018/0246756 A1* | 8/2018 | Abali | G06F 9/544 |
| 2019/0079790 A1* | 3/2019 | Tagashira | G06F 9/45558 |
| 2019/0182211 A1* | 6/2019 | Yang | H04L 61/2592 |
| 2019/0310881 A1* | 10/2019 | Gupta | G06F 9/45558 |

* cited by examiner

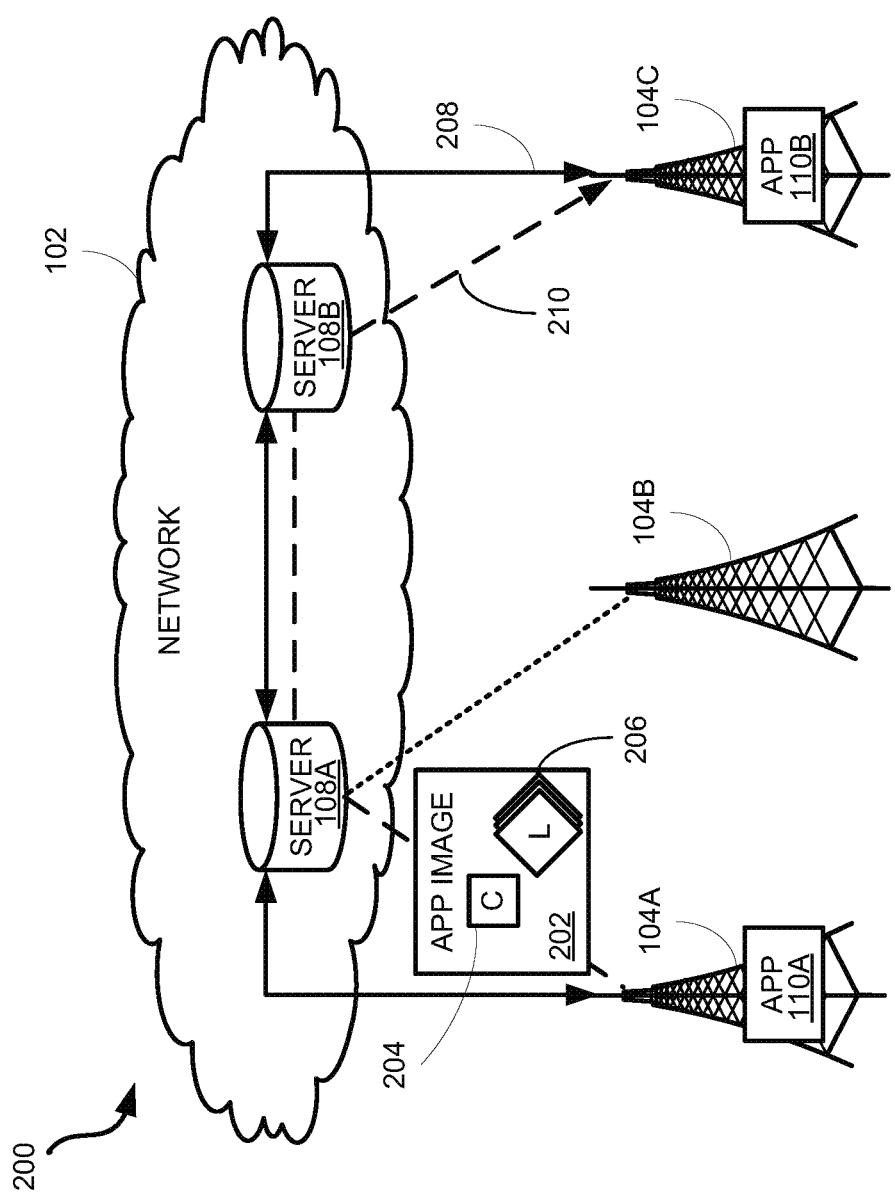

SYSTEM AND METHOD FOR MIGRATING A LIVE STATEFUL CONTAINER

TECHNICAL FIELD

The present technology pertains to management of containers and applications in a network environment.

BACKGROUND

As compute capability is offloaded to nodes within a network, software applications are increasingly hosted on devices such as servers, base stations, and others that are remotely accessed by users of the applications. In particular, hosted applications serving mobile users often must maintain serving requests as the user moves between access points in the network. In many cases, latency and other factors contributing to responsiveness are of the utmost importance and so the hosted application needs to migrate throughout the network in order to maintain a sufficient level of responsiveness for the user. However, applications must often continue serving requests while migrating to avoid added latency and service disruptions. In information-centric networks and other architectures, it is substantially difficult to maintain persistent and uninterrupted service during a migration procedure.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 2 illustrates an example network environment and backend, according to various embodiments of the subject technology;

DESCRIPTION OF EXAMPLE EMBODIMENTS

Figure 1B:
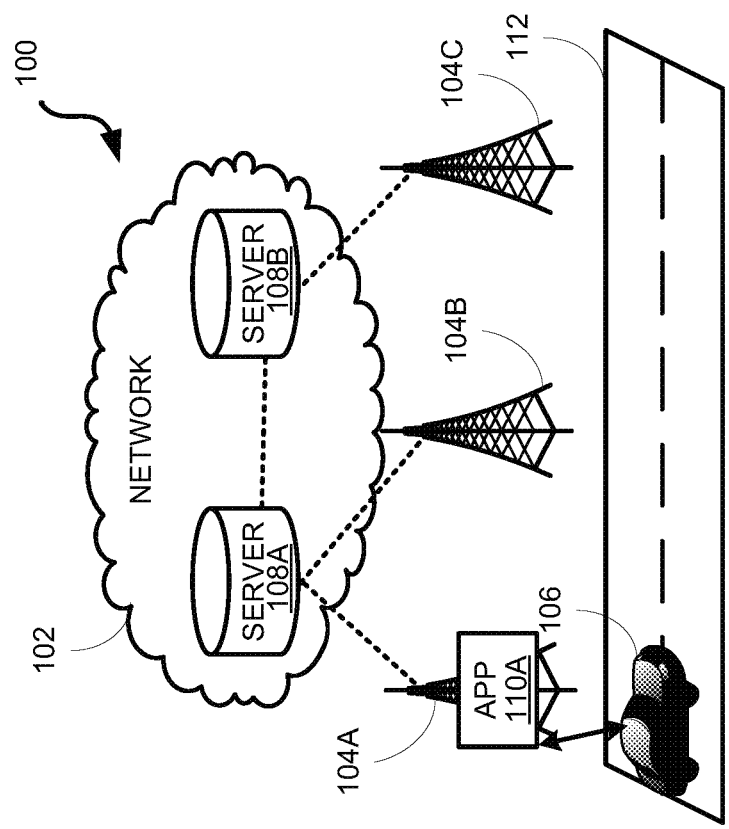
FIG. 1B illustrates an example operating environment, according to various embodiments of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Migration of a stateful application can generate difficulties in maintaining service requests to the application during the migration and may also be difficult to perform seamlessly. For example, in mobile edge computing (MEC), a device, such as an "Internet-of-Things" (IOT) device, can transition between nodes serving the IOT device while still transmitting requests to applications (e.g., containerized applications and the like) provided by the nodes. Because each node in a network cannot realistically host every single application simultaneously, applications may migrate between nodes in order to continuously serve requests. In particular, where latency is of concern for a mobile IOT device or where applications otherwise need to frequently transition between nodes and the like, a seamless and stateful migration between nodes may be desirable.

The disclosed technology addresses the need in the art for stateful migration of live application containers without packet loss. Disclosed herein are systems, methods, and computer-readable media for migrating an application container between nodes on a network while serving incoming request streams. An interest for the application container can be received by an origin node and from a destination node on the network. A copy of the application container can be transmitted from the origin node to the destination node. The application container at the origin node may then be shut down and remaining container state at the origin node may be transmitted to the destination node. The destination node may then update the routing plane of the network to route network traffic for the application container to the destination node.

Description of Example Embodiments

In one example, a container, virtual machine (VM), or the like can be migrated live over an information-centric network (ICN) without packet loss. Consider a network including base stations equipped with a compute infrastructure. For example, a 5G network may include multiple base stations for providing Internet or other network connectivity to MEC devices such as, for example and without imputing limitation, a car or a device inside a car. Further, as the car moves between base stations, an application, which is provided at a first base station, may either be provided at a second base station or communications between the car and the application may be routed to the first base station (e.g., from the second or any other base station of which the car moves into range).

However, where the application has, for example, latency or scalability concerns, routing communications between the car, through the second base station, and to the first base station can result in a convergence time that is too high. In particular, where an ICN includes a global routing protocol, convergence times for routed transmissions may be incompatible with, for example, low-latency applications and the like. As a result, the application may instead be migrated between base stations in order to maintain a low latency connection with the car.

In one example, the application can be migrated between base stations and across the ICN (e.g., over interim network nodes within the ICN and between the base stations). A destination node (e.g., the second base station) may send to an origin node (e.g., the first base station) an "interest packet" requesting the application container. For example, the second base station may receive a request from the car for data produced by the application running on the first base station as the car traverses between coverage areas of the base stations. This request (e.g., for data provided by an application at a different node) may cause the second base station to transmit a migration request for the respective application (in other words, the application container along with any associated state) from the first base station and to the second base station itself.

In the context of an ICN, an interest packet includes a request for some specified data. Interest packets may be forwarded across nodes throughout the ICN until a producer of the specified data receives the interest packet. Each node in the ICN may determine a next node (e.g., a face) to forward the interest packet to by using an internally stored forwarding information base (FIB). The FIB may store a list of faces, for retrieving data, associated with prefixes or names. The FIB can be used to identify an appropriate face for which to forward the interest packet by matching the interest packet (e.g., through a name or specified data source included in the interest packet) to the longest prefix or most closely matching name. Faces can include interfaces, such as network interfaces and the like, next-hop L2 Ethernet addresses, next-hop IP addresses (e.g., for ICN over IP), local applications, or any other possible next-hop within the ICN.

In response to receiving an interest packet, the producer may generate the specified data and transmit it back throughout the ICN as a "data packet" which may be forwarded between nodes in the ICN based on entries in a pending-interest table (PIT) which are generated as the original interest packet traversed through the ICN. Each entry on the PIT includes requesting faces (e.g., faces from which an interest packet was forwarded) and so the data packet may be matched to an appropriate PIT entry and then forwarded to each face stored in the entry. Each receiving face may repeat this process (e.g., matching to an appropriate PIT entry and forwarding accordingly) until the data packet is forwarded to the node from which a respective interest packet was generated. The aggregated FIBs and PITs of the nodes of the ICN are often referred to simply as the forwarding plane and the like.

Returning to the example of the car above, the first base station, or origin node, can receive via the ICN the interest packet requesting the application container. In response, the origin node may transmit a copy of the application container as a data packet over the ICN and back to the requesting destination node. In other words, the application may be treated by the ICN as a transmittable data object. Further, said transmittable data object may use a routable name prefix shared, in at least a portion, as that used by interest for the application (e.g., application interests). For example, an application interest may be of a form as follows: ~/prefix/for/app/some/content. In comparison, a container interest may be of a form: ~/prefix/for/app/migration. Each interest includes the prefix: ~/prefix/for/app. As a result, a construction of the routing plane resulting from forwarded application interests can be used to resolve container interests as well.

In some examples, the copy of the application container may be in the form of manifests. For example, and without imputing limitation, a manifest may include a configuration file and multiple "layers" or application images (e.g., memory snapshots) which may be overlaid one atop the other until a cohesive and operable containerized application has been constructed. Concurrent to the copy of the application container making its way to the destination node, the application container at the origin node may continue to serve requests received as interest packets from the ICN.

The origin node may shut down the application container once a final interest packet requesting the application container is received. For example, where a manifest including layers is used to transmit the application container, each layer may be requested iteratively as sequential interest packets each requesting one or more layers. Any remaining state may then be transmitted to the destination node as a data packet. In some examples, an application may update an internal state and the like in response to or as part of processing requests and the like. As a result of the application continuing to serve requests during migration, the application state at the time of transmission of the copy of the application container may differ from the application state at the time the origin node is ready to shut down the application. In order to ensure seamless service without any data loss, the changes in state may be transmitted as, for example, an additional manifest layer and the like to the destination node.

In some examples, the two channels may be defined for traversing the ICN. A first channel may define a migration path of the application container from the origin node to the destination node. This first channel may be for interest packets in the application container itself, or container interests, and so may link a destination node or hypervisor and an origin node or hypervisor. Further, the two channels can be implicitly defined by a shared forwarding plane resulting from a shared prefix naming scheme as discussed above. In effect, the two channels can be maintained without managing any additional state for the forwarding plane and the like.

The first channel may facilitate transit of an image of the application container between channel endpoints. In one example, a manifest-based ICN exchange can be used. A base image of the application container (e.g., including binary and configuration files as they are stored on disk) and a current image (e.g., state of random access memory (RAM) and the like) can be iteratively transmitted to the destination node as data packets.

In comparison, a second channel can define a request path through the ICN from a MEC device such as, for example, the car from the examples discussed above. The second channel can carry interest packets from the MEC device to the application on the origin node in order to continue service throughout the migration process. In other words, application interests may traverse the ICN via the second channel.

In one example, once the origin node has sent the last data packet including remaining components of the image of the application container, the origin node can terminate the original container. Further, any requests received by the origin node as application interest packets may then be stored in a buffer (e.g., an origin buffer node) for later transmission to the migrated application (e.g., the completed application at the destination node).

Once the destination node receives the remaining components of the container image, it may start the container in order to the migrated application to serve requests and the like. Further, the destination node can update the forwarding plane of the ICN to ensure application interest packets are provided to it. In some examples, the destination node transmits a "Map-Me" protocol or the like which can be used to update the forwarding plane with appropriate faces and/or prefixes.

In one example, the buffered application interest packets stored at the origin node may be transmitted to the destination node in response to receiving the forwarding plane update from the destination node. In effect, the receipt of the update may inform the origin node of an appropriate face by which to forward the application interest packets to the migrated application.

In some examples, the destination node may buffer application interests received while the application is mid-migration (e.g., by including a destination node buffer). In such a case, and/or where the order of requests is a factor in the execution of the application (e.g., where each request relies on an internal state of the application and each request also alters the internal state of the application and the like), the buffer at the destination node may receive the buffer from the origin node and merge the buffers into an appropriate order.

Further, the return path of requests (e.g., application interests) can be updated in order to ensure proper delivery where, for example, a request was sent via the first node but should be received via the second node such as when a car transmits a request as it transitions between base station coverage and the like. In some network configurations, such as ICNs, the added difficulty of requests not including a source address can make this a particularly challenging scenario. In one example, a bifurcated approach can be used to update the return path for requests appropriately.

The origin node may send to the destination node a copy of its PIT entries for the migrated application. In some examples, this may be transmitted prior to buffered interest packets and so may additionally provide to the destination node an indication to halt processing any otherwise received application interest packets until the buffered application interest packets from the origin node are received. The received PIT entries may then be merged into the PIT of the destination node and a virtual loopback face may be used to store responses into a content store of the destination node or transmit out to the requesting MEC device (e.g., the car) and the like.

Additionally, the origin node may transmit flagged application interests to the destination node for any unsatisfied entries on the origin node PIT. The flagged application interest may contain additional content including update instructions for on-path routers (e.g., routers by which the interest packet is forwarded).

At each router, if a PIT entry does not exist for the flagged application interest packet, then the flagged application interest may be processed as any other interest would be (e.g., as a non-flagged application interest). In other words, a new PIT entry may be added for the flagged application interest and then the router forwards the flagged application interest to a new face according to the FIB.

If a PIT entry does exist for the flagged application interest packet, the FIB may then be examined in order to determine which one of two courses of action may be taken. If the matching PIT entry includes a face that is identical to the updated FIB entry, the PIT entry may be deleted and the flagged application interest may be forwarded (according to the FIB). This way, outdated entries may be deleted from each router PIT as they are matched to the respective application interest packet being forwarded to the destination node.

Alternatively, where a PIT entry does exist and the updated FIB entry indicates a different face, the flagged application interest is simply forwarded according to the FIB and the router PIT is left unaltered. In effect, this "mismatch" indicates an unrelated application interest packet (e.g., currently in buffer at the destination node and the like) and so it is already in a correct state.

The above strategy for determining the updated path can provide deterministic performance and reduced network overhead by using the forwarding path generated by the ICN update from the destination node (e.g., via Map-Me and the like). In effect, unsuccessful paths are not explored and so network compute time and bandwidth usage is not unnecessarily wasted. In the context of MEC devices, this may be of increased benefit as migrations may occur between topologically distant nodes and thus there may be many unsuccessful paths between the nodes. In some examples, all of the buffered application interest packets can be aggregated into a single interest packet by, for example, transmitting one interest packet to the destination node including all relevant suffixes, names, and/or the like.

Figure 1A:
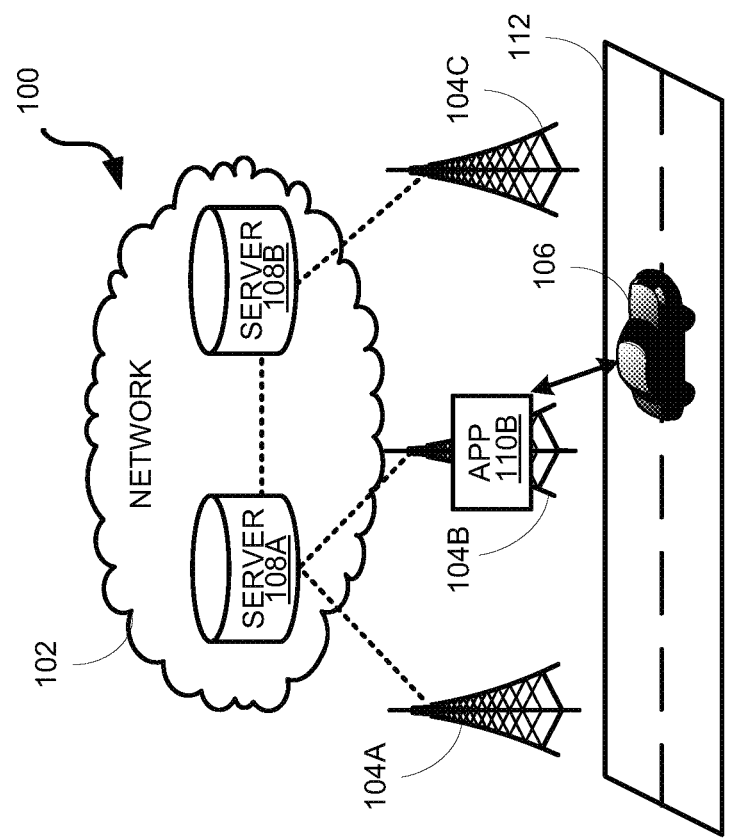
FIG. 1A illustrates an example operating environment, according to various embodiments of the subject technology.

FIGS. 1A-B both depict an operating environment 100 in which a hosted application may be transferred, or migrated, between network nodes. For example, migration may occur as a user accessing the hosted application travels between physical nodes. In some examples, migration may occur when the user transitions service between network slices. When transitioning between network slices and the like, a path between a user and the node hosting the accessed application can become larger, either virtually (e.g., due to traversal requirements across the network graph and such) or physically (e.g., due to nodes, or servers, being located physically far apart). In such a case, migrating a hosted application to a more proximate, virtual or physical, node can provide reduced latency and/or increased responsiveness, among other benefits which will be apparent to a person having ordinary skill in the art.

Operating environment 100 includes a network 102 which may be a mobile wireless network or other communications network. Network 102 can be provided by one or more carriers or service providers and includes servers 108A-B for performing network functions and such. For example, a network slice serving a particular customer or customer group may be distributed within network 102 across servers 108A-B. Servers 108A-B can host one or more network functions such as, by way of example and without imputing limitation, an authentication and mobility management function, a session management function, a policy management function, and others as will be apparent to a person having ordinary skill in the art. Further, in some examples, servers 108A-B may additionally provide other services such as file storage and such.

Servers 108A-B may intercommunicate across network 102 as well as with various base stations 104A-C. In some examples, network 102, and thus servers 108A-B and also base stations 104A-C, may be an information-centric network (ICN). As an ICN, components of network 102 can be provided, virtually or via dedicated hardware, by servers 108A-B. Further, in some examples, base stations 104A-C may possess sufficient compute for hosting an "app" 110A-B, or software application. While app 110A-B is the same application, it is understood that app 100A is the application pre-migration, or as deployed on the origin node, and app 110B is the same application post-migration, or deployed on the destination node.

App 110A-B can be any hosted application. In comparison to a local application, a hosted application runs on a remote provider such as base station 104A and can be accessed by a user via a mobile device, web terminal, laptop, and the like as will be apparent to a person having ordinary skill in the art. While FIGS. 1A-B depict base stations 104A-B as hosting apps 110A-B, some examples may include servers 108A-B or base station 104C hosting apps 110A-B. Generally any node having sufficient compute and network linkage can host, or serve, a software application.

As an example, and without imputing limitation, app 110A may provide navigation support to car 106. Here, car 106 travels along road 112 and, as a result, passes sequentially between base stations 104A-C. For latency sensitive applications, it may be the case that a software application maintains a presence at the nearest receiving transmission node for a respective user. For example, app 110A-B may migrate between base stations 104A-B as car 106 exits from a threshold proximity to base station 104A and enters into a threshold proximity to base station 104B.

The migration can be triggered by, for example, a switch between which base station 104A-C is receiving and processing a signal from car 106. For example, while car 106 remains in primary contact with base station 104A, any signals from car 106 requesting service from app 110A-B may be immediately serviced by receiving base station 104A. However, once car 106 transitions to a service area controlled by base station 104B (e.g., base station 104B because of the primary contact), service requests for app 110A-B may initially be routed to app 110A hosted on base station 104A, and so base station 104B can receive from car 106 a service request that makes its way to app 110A on base station 104A. In some examples, this may trigger a migration of app 110A-B to base station 104B so that service requests from car 106 may be more responsive due to a shorter transmission and routing distance to base station 104B (hosting migrated app 110B).

In some examples, variables, or state, of a software application may continue to change during a migration between nodes. Here, where app 110A-B is providing navigation assistance, state maintained by app 110A-B may include, for example and without imputing limitation, location information for car 106 as it is moving along road 112, a selected route, real-time traffic information, suggested routes, and other such information as will be apparent to a person having ordinary skill in the art. Further, app 110A may continue to serve requests from car 106 as migration to app 110B occurs along with transitioning of request server from app 110A to app 110B.

FIG. 2 depicts a migration environment 200 for moving app 110A-B from base station 104A to base station 104C. It is understood that the same process may be performed to move app 110A-B to base station 104B or in fact any other capable node connected with network 102 (e.g., servers 108A-B and the like). In some examples, migration may be triggered by a network event (e.g., car 106 traveling from an area serviced by base station 104A to base station 104C, upon a threshold number of routing hops, or such). In some examples, migration can be triggered by a request from a user, system or network administrator, or other network participant as will be apparent to a person having ordinary skill in the art.

In some examples, migration of an application can occur via two channels 208, 210 in order to provide seamless service (e.g., continue serving requests throughout the migration process) while migrating app 110A-B with up-to-date state. Migration channel 210 services container interests and provides for transfer of app 110A-B; at the same time, service channel 208 services applications interests and enables app 100A to continue serving requests while app 110B deploys and prepares to take over service.

Upon triggering migration of app 110A-B, base station 104C may send a service request to base station 104A for app container image 202. In some examples, where network 102 is an ICN, the service request may designate the application or application instantiation sought. In an ICN architecture, network 102 may then carry the service request to an endpoint capable of fulfilling the request (e.g., base station 104A hosting app 110A).

Upon receiving the service request for app container image 202, base station 104A can produce and send app container image 202 to base station 104C via migration channel 210. In some examples, app container image 202 includes a configuration file 204 and multiple container image layers 206. Configuration file 204 may include various variable definitions and settings such as, for example and without imputing limitation, port settings, memory settings, user settings, etc. Container image layers 206 may include a base layer over which multiple other layers are laid in order to generate a completed application container image. In some examples, the base layer may provider a core operating system or kernel and each sequentially layered container image layer 206 provides file, component, and executable binary mappings which are overlaid in sequence in order to provide dependencies and the like to later "installed" images. In some examples, each layer of container image layers 206 can be sequentially sent to base station 104C via migration channel 210 in order to produce app 110B.

Meanwhile, app 110A may continue to serve requests received by base station 104C and transmitted to base station 104A via network 102 over service channel 208. In some examples, for part or all of the migration, app 110A may cease serving requests and base station 104A may instead maintain a buffer of requests for later transmission to base station 104C to be served by app 110B. Once container image layers 206 have been fully received by base station 104C, app 110B may be fully instantiated and app 110A may be shut down and removed from base station 104A. Further, any buffered service requests for app 110A-B held by base station 104A can be transmitted to app 110B at base station 104C via either service channel 208 or migration channel 210.

In some examples, the final buffered transmissions may be flagged in order to update pending interest table (PIT) entries across an ICN. Further, in some examples, app 110B may, upon being started, update forwarding information base (FIB) entries throughout the ICN. Receipt of a FIB update at base station 104A may signal to base station 104A to transmit flagged buffered transmissions to base station 104C for processing by app 110B and in order to update PIT entries at nodes along the path to base station 104C (discussed further in relation to FIG. 4 below). Once app 110B has received the buffered transmissions, the buffered transmissions may be processed by app 110B in the order they are received. In some examples, app 110B may buffer received requests as it awaits the request buffer from app 110A, for example, in cases where the order of service request processing in important or necessary to the processing of the requests themselves.

Figure 3:
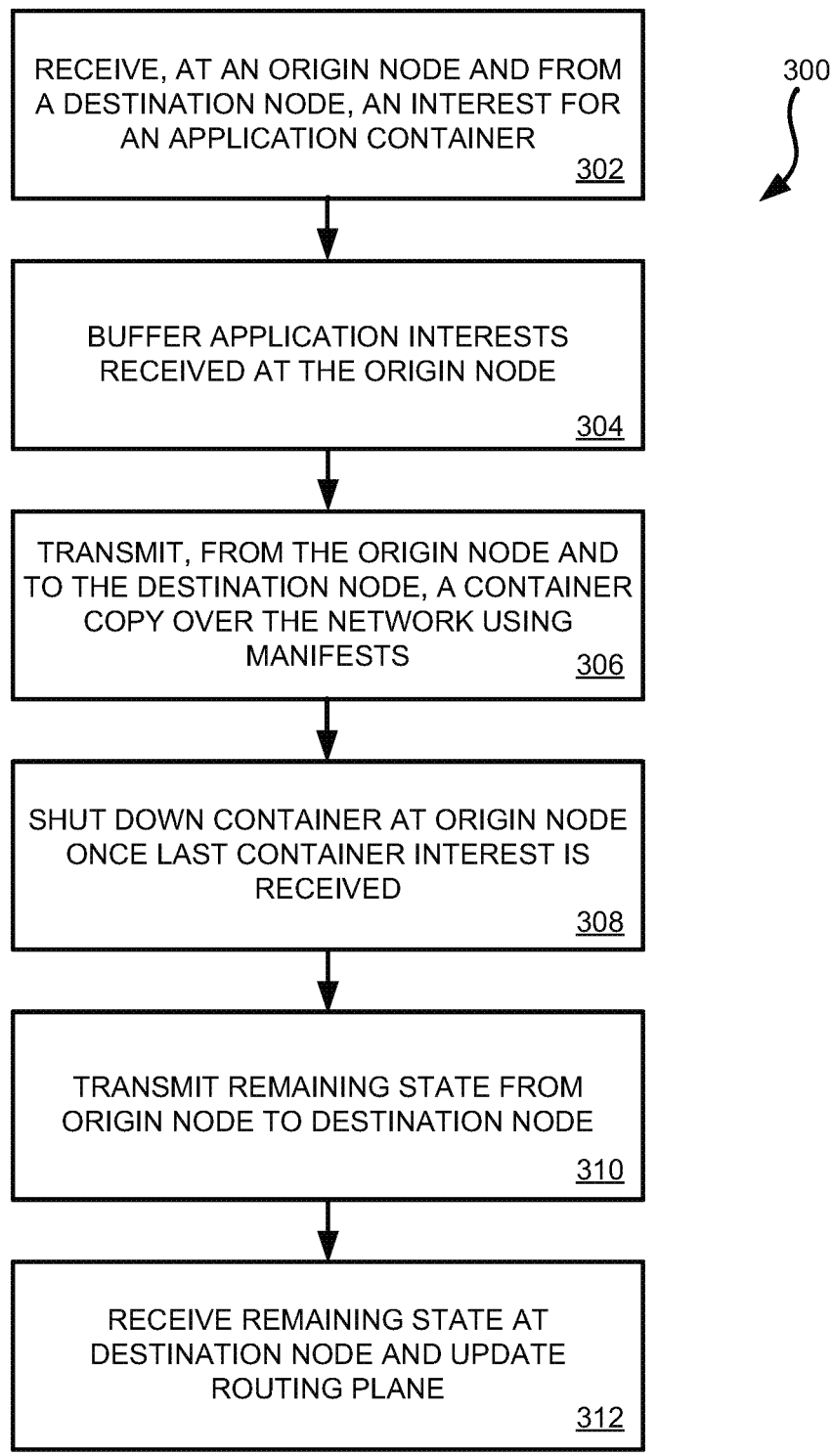
FIG. 3 depicts an example method for migrating a container across a network, according to various embodiments of the subject technology.

Application containers, such as app 110A-B for example and without imputing limitation, can be migrated as depicted by FIG. 3 and according to method 300. Method 300 may be performed over, for example, network 102 and the like. In some examples, method 300 may be trigged by, for example, car 106 traveling between base stations 104A-C which can be represented as nodes within a network graph or other topological abstraction and such.

For example, where car 106 travels out of transmission range of base station 104A and into transmission range of base station 104B, base station 104B, a destination node, may receive an interest, or a service request, for an application (e.g., app 110A) from car 106 in form of a service request for a navigation application and the like. As a result, an origin node may then receive from the destination node an application container interest (operation 302). In other words, the destination node can request the application itself from the origin node (e.g., as compared to routing a service request, etc.).

Upon receipt of the application container interest, the origin node can buffer further application interests for later processing (operation 304). In effect, the buffer may be a specialized pending interest table (PIT) or section of a PIT. In some examples, any interests received via, for example, service channel 210 may be buffered for later processing after the application has been successfully migrated.

The origin node can then transmit to the destination node a copy of the container image over the network (e.g., network 102) using container manifests (operation 306). In some examples, a container manifest may include a configuration file and multiple image layers (as described above). In some examples, transmitting the container image may be done iteratively by, for example, first transmitting a configuration file for creation of an empty container at the destination node. A base layer may then be transmitted and deployed to the empty container before sequential file image layers are transmitted and iteratively overlaid within the container at the destination node in order to generate a complete copy of the container image.

In some examples, each successful deployment of each container file image layer may cause the destination node to transmit a container interest (for example, via migration channel 210). As a result, once the last container interest is received by the origin node, the application container at the origin node may be shut down (operation 308). In some examples, various "state" may be associated with the application container at the origin node such as, for example and without imputing limitation, side containers, configuration files, user variables, and the like. Any remaining state may be transmitted from the origin node to the destination node (operation 310).

The destination node may receive the remaining state and update routing plane information across, for example, network 102 in response (operation 312). In some examples, the remaining state can include, for example, a most recent RAM image of the application container (e.g., mapping to a current state of processes) and such. Further, in some examples, the destination node may update the routing plane via protocols such as, for example, Map-Me and the like, or other algorithms using graph or network exploration and rewrite rules and the like, as will be apparent to a person having ordinary skill in the art. In particular, in ICNs and the like, the destination node may update forwarding information bases (FIBs) for routers within the ICN so that interests associated with, for example, app 110A-B are correctly routed to the migrated application.

Figure 4:
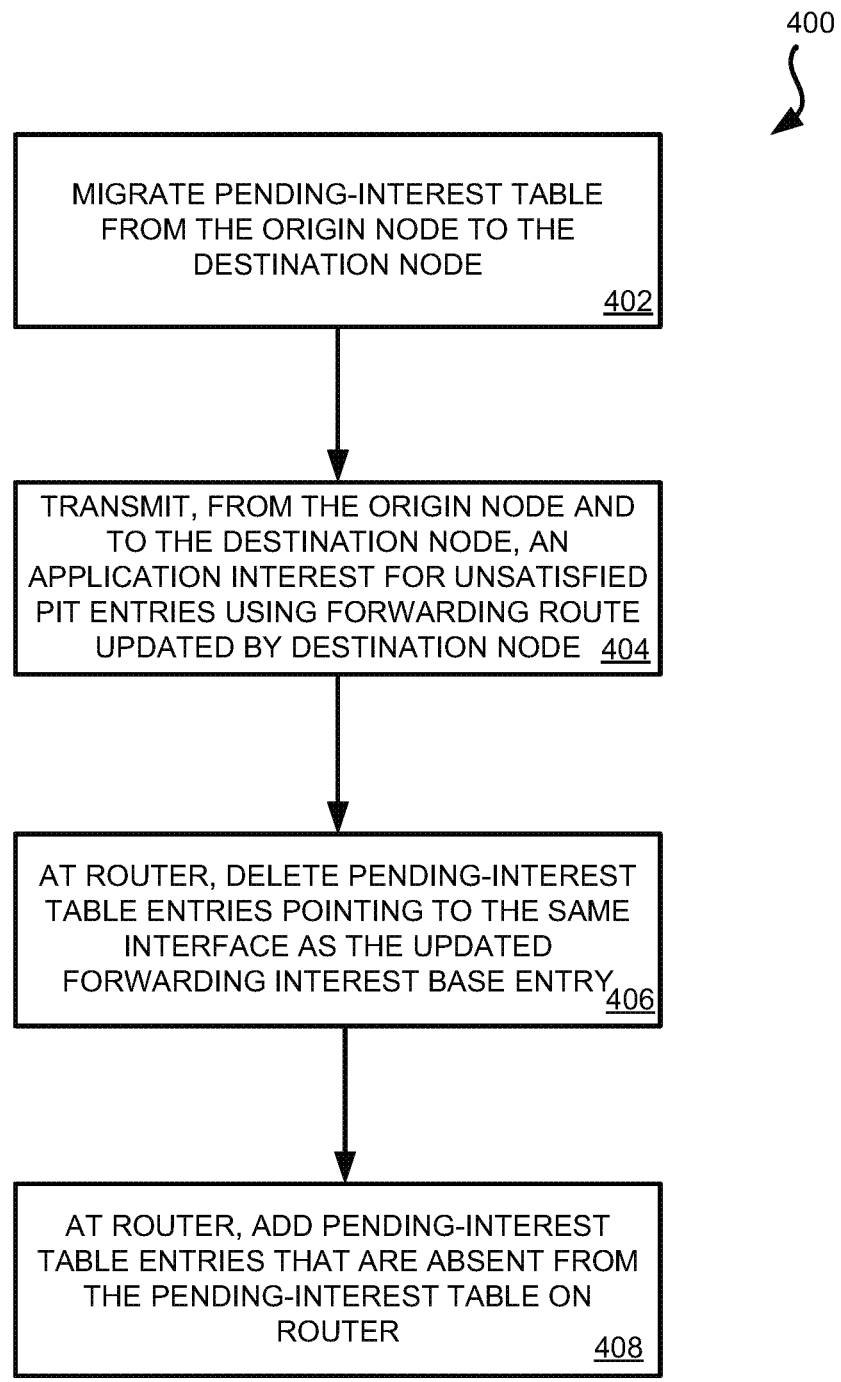
FIG. 4 depicts an example method for updating a routing plane of a network, according to various embodiments of the subject technology.

In some examples, pending-interest tables (PITs) for routers within the network (e.g., an ICN) may also be updated once the FIBs have been updated as discussed above. FIG. 4 depicts a method 400 for performing such an update so that any pending interests that had originally been associated with, for example, app 110A can have that association be changed to app 110B (e.g., the migrated application).

A pending-interest table for the origin node may be migrated to the destination node (operation 402). In some examples, the origin node may initiate the migration upon receiving, for example, a FIB update from the destination node (e.g., as part of operation 312). In some examples, the PIT for the origin node may migrate over, for example, migration channel 210.

The origin node may then transmit application interests for unsatisfied PIT entries to the destination node using the updated router FIBs (operation 404). In some examples, the application interest can be flagged so that receiving routers will perform a compare and/or update procedure upon receipt of the application interest. Furthermore, in some examples, a single packet may be sent across the network including all unsatisfied pending application interests to more efficiently update router PITs in subsequent operations.

A router receiving the application interests may delete PIT entries pointing to an identical face (e.g., network node or interface, router, base station, etc.) as that stored in the updated FIB entry for the same destination (operation 406). However, where the router receiving the application interests contains PIT entries pointing to a different face than that of the updated FIB entry, the PIT entry can be kept and the application interests forwarded according to the FIB entry. In other words, the updated FIB points to a certain face directing interests specific to, for example, app 110B (e.g., migrated app 110A-B), and so PIT entries intended for app 110A (e.g., "pre-migrated" app 110A-B) should now be redirected to the certain face for the migrated application.

The router receiving the application interests may also add PIT entries related to the transmitted application interest that are absent from the router PIT (operation 408). In effect, this updates the router PIT to a current state of the network. In some examples, where a network path changes due to the migration, some routers (and thus associated PITs) may no longer be along the network path and some other routers may now be newly added to the network path to provide an efficient route to the migrated application. Once the PIT entries of the network have updated, the entire network may accurately reflect correct pathing to the migrated application in both the PITs and the FIBs.

Figure 5:
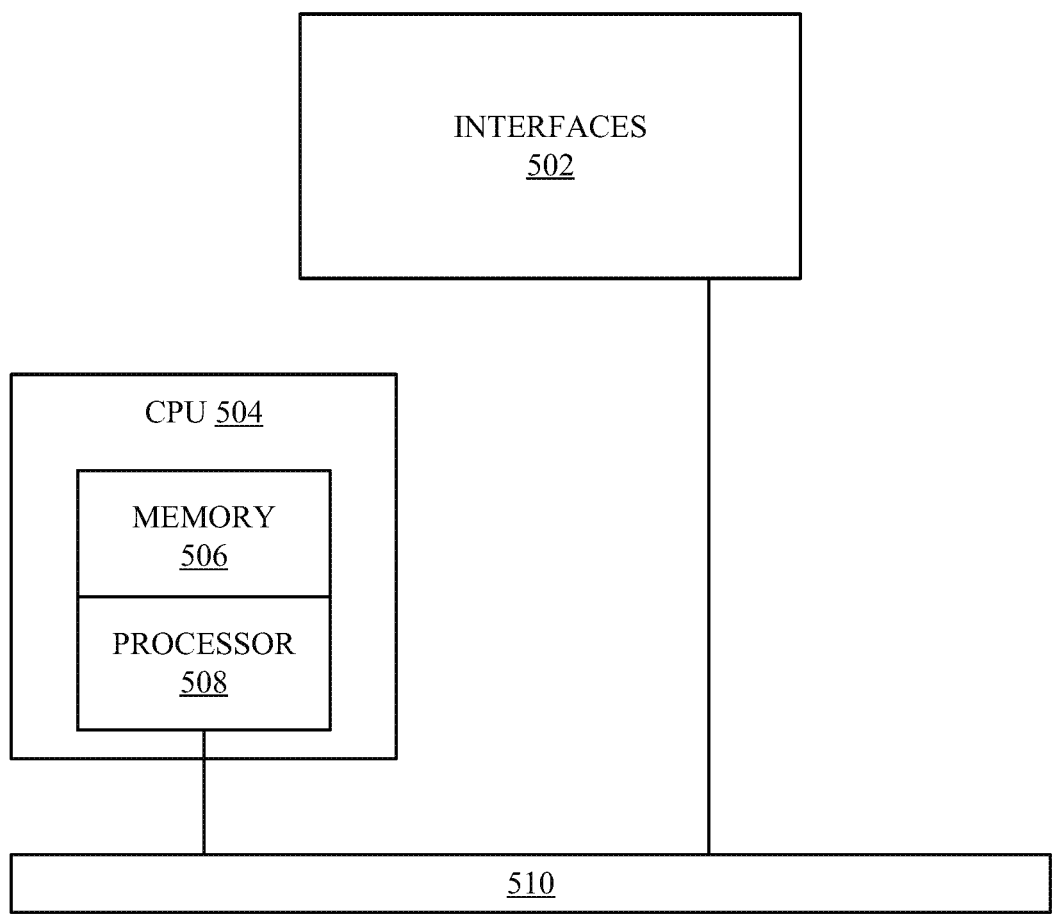
FIG. 5 illustrates an example network device, according to various embodiments of the subject technology.

Although the system shown in FIG. 5 is one specific network device of the present disclosure, it is by no means the only network device architecture on which the concepts herein can be implemented. For example, an architecture having a single processor that handles communications as well as routing computations, etc., can be used. Further, other types of faces and media could also be used with the network device 500.

Regardless of the network device's configuration, it may employ one or more memories or memory modules (including memory 506) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 506 could also hold various software containers and virtualized execution environments and data.

The network device 500 can also include an application-specific integrated circuit (ASIC), which can be configured to perform routing, switching, and/or other operations. The ASIC can communicate with other components in the network device 500 via the connection 510, to exchange data and signals and coordinate various types of operations by the network device 500, such as routing, switching, and/or data storage operations, for example.

Figure 6:
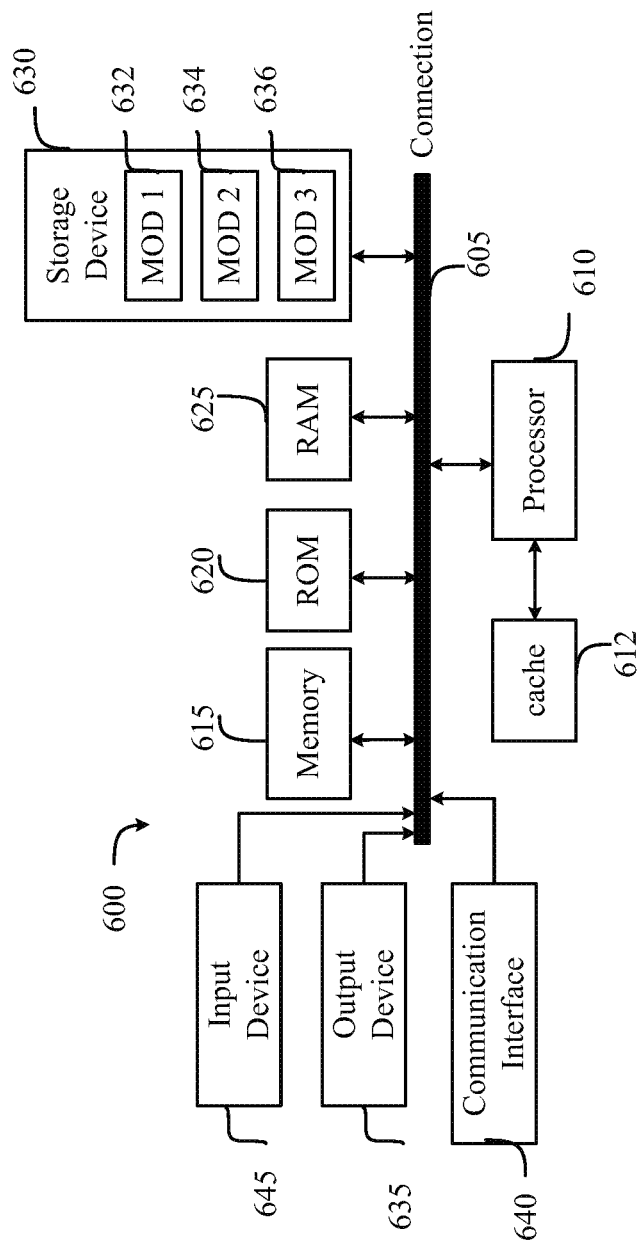
FIG. 6 illustrates an example computing device, according to various embodiments of the subject technology.

FIG. 6 illustrates a computing system architecture 600 including components in electrical communication with each other using a connection 605, such as a bus. System 600 includes a processing unit (CPU or processor) 610 and a system connection 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware or software service, such as service 1 632, service 2 634, and service 3 636 stored in storage device 630, configured to control the processor 610 as well as a special-purpose processor where software instructions are incorporated into the actual processor design. The processor 610 may be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include services 632, 634, 636 for controlling the processor 610. Other hardware or software modules are contemplated. The storage device 630 can be connected to the system connection 605. In one aspect, a hardware module that performs a particular function can include the software component stored in a computer-readable medium in connection with the necessary hardware components, such as the processor 610, connection 605, output device 635, and so forth, to carry out the function.

For clarity of explanation, in some instances the present technology may be presented as including individual functional blocks including functional blocks comprising devices, device components, steps or routines in a method embodied in software, or combinations of hardware and software.

In some examples the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Numerous examples are provided herein to enhance understanding of the present disclosure. A specific set of statements of the disclosure include:

Statement 1: A method is disclosed and comprises: receiving, over an information-centric network and by an origin node, an interest packet for an application container, the interest packet comprising a request for migrating the application to a destination node, and the information-centric network comprising one or more interim network nodes between the origin node and the destination node; transmitting, over the interim network nodes and to the destination node, a copy of the application container; shutting down, at the origin node, the application container; transmitting, over the interim network nodes and to the destination node, a remaining container state, the remaining container state comprising changes to a runtime of the application occurring during transmission of the copy of the application container; and updating, by the destination node, a routing plane of the network for routing network traffic for the application container to the destination node.

Statement 2: A method is disclosed according to Statement 1, further comprising: generating, at the origin node, an origin node buffer for receiving and holding requests directed to the application and received at the origin node; and transmitting, from the origin node to the destination node and over the interim network nodes, the origin node buffer.

Statement 3: A method is disclosed according to Statement 2, further comprising: generating, at the destination node, a destination node buffer for receiving and holding requests directed to the application and received at the destination node while the application migrates.

Statement 4: A method is disclosed according to Statement 3, further comprising: merging, at the destination node, the origin node buffer into the destination node buffer.

Statement 5: A method is disclosed according to Statement 4, wherein application requests of the merged origin node buffer and destination node buffer are ordered according to a time of receipt.

Statement 6: A method is disclosed according to any of preceding Statements 1-5, wherein updating the routing plane of the network comprises: transmitting, from the origin node and to the destination node, one or more table entries for the application container; merging, at the destination node, the one or more table entries for the application container into a table at the destination node; transmitting, from the origin node and to a router, a flagged copy of a portion of the one or more table entries; and executing, at the router, at least one of a deletion of a router entry matching the flagged copy, an update of the router entry to refer to the destination node, or an addition of a new router entry comprising the flagged copy.

Statement 7: A method is disclosed according to any of preceding Statements 1-6, wherein the interest packet for the application container shares a routing plane and naming convention with one or more interest packets for services provided by an application corresponding to the application container.

Statement 8: A system is disclosed and comprises: a hardware processor; and a memory comprising instructions which, when executed by the hardware processor, cause the processor to: receive, over an information-centric network and by an origin node, an interest packet for an application container, the interest packet including a request for migrating the application to a destination node and the information-centric network comprising one or more interim network nodes between the origin node and the destination node; transmit, over the interim network nodes and to the destination node, a copy of the application container; shut down, at the origin node, the application container; transmit, over the interim network nodes and to the destination node, a remaining container state, the remaining container state including changes to a runtime of the application occurring during transmission of the copy of the application container; and update, by the destination node, a routing plane of the network for routing network traffic for the application container to the destination node.

Statement 9: A system is disclosed according to Statement 8, the memory further comprising instructions that, when executed by the hardware processor, cause the processor to: generate, at the origin node, an origin node buffer for receiving and holding requests directed to the application and received at the origin node; and transmit, from the origin node to the destination node and over the interim network nodes, the origin node buffer.

Statement 10: A system is disclosed according to Statement 9, the memory further comprising instructions that, when executed by the hardware processor, cause the processor to: generate, at the destination node, a destination node buffer for receiving and holding requests directed to the application and received at the destination node while the application migrates.

Statement 11: A system is disclosed according to Statement 10, the memory further comprising instructions that, when executed by the hardware processor, cause the processor to: merge, at the destination node, the origin node buffer into the destination node buffer.

Statement 12: A system is disclosed according to Statement 11, wherein application requests of the merged origin node buffer and destination node buffer are ordered according to a time of receipt.

Statement 13. A system is disclosed according to any of preceding Statements 8-12, wherein updating the routing plane of the network comprises: transmitting, from the origin node and to the destination node, one or more table entries for the application container; merging, at the destination node, the one or more table entries for the application container into a table at the destination node; transmitting, from the origin node to a router, a flagged copy of a portion of the one or more table entries; and executing, at the router, one of a deletion of a router entry matching the flagged copy, an update of the router entry to refer to the destination node, or an addition of a new router entry comprising the flagged copy.

Statement 14: A system is disclosed according to any of preceding Statements 8-13, wherein the interest packet for the application container shares a routing plane and naming convention with one or more interest packets for services provided by an application corresponding to the application container.

Statement 15: A non-transitory computer readable medium is disclosed and comprises instructions that, when executed by a network device, causes the network device to: receive, over an information-centric network and by an origin node, an interest packet for an application container, the interest packet including a request for migrating the application to a destination node and the information-centric network comprising one or more interim network nodes between the origin node and the destination node; transmit, over the interim network nodes and to the destination node, a copy of the application container; shut down, at the origin node, the application container; transmit, over the interim network nodes and to the destination node, a remaining container state, the remaining container state including changes to a runtime of the application occurring during transmission of the copy of the application container; and update, by the destination node, a routing plane of the network for routing network traffic for the application container to the destination node.

Statement 16: A non-transitory computer readable medium is disclosed according to Statement 15 further comprising instructions that, when executed by a network device, cause the network device to: generate, at the origin node, an origin node buffer for receiving and holding requests directed to the application and received at the origin node; and transmit, from the origin node to the destination node and over the interim network nodes, the origin node buffer.

Statement 17: A non-transitory computer readable medium is disclosed according to Statement 16 further comprising instructions that, when executed by a network device, cause the network device to: generate, at the destination node, a destination node buffer for receiving and holding requests directed to the application and received at the destination node while the application migrates.

Statement 18: A non-transitory computer readable medium is disclosed according to Statement 17 further comprising instructions that, when executed by a network device, cause the network device to: merge, at the destination node, the origin node buffer into the destination node buffer, the merged buffers ordered according to a time of receipt.

Statement 19: A non-transitory computer readable medium is disclosed according to any of preceding Statements 15-18, wherein the interest packet for the application container shares a routing plane and naming convention with one or more interest packets for services provided by an application corresponding to the application container.

Statement 20: A non-transitory computer readable medium is disclosed according to any of preceding Statements 15-19, wherein updating the routing plane of the network comprises: transmitting, from the origin node and to the destination node, one or more table entries for the application container; merging, at the destination node, the one or more table entries for the application container into a table at the destination node; transmitting, from the origin node to a router, a flagged copy of a portion of the one or more table entries; and executing, at the router, one of a deletion of a router entry matching the flagged copy, an update of the router entry to refer to the destination node, or an addition of a new router entry comprising the flagged copy.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
   receiving, at an origin node from a destination node sent over an information centric network, an interest packet for an application container, the interest packet comprising a request for migrating the application container to the destination node, and the information-centric network comprising one or more interim network nodes between the origin node and the destination node;
   transmitting, over the interim network nodes and to the destination node, a copy of the application container;
   shutting down, at the origin node, the application container;
   transmitting, over the interim network nodes and to the destination node, a remaining container state, the remaining container state comprising changes to a runtime of the application container occurring during transmission of the copy of the application container; and
   updating, by the destination node, a routing plane of the information-centric network for routing network traffic for the application container to the destination node.

2. The method of claim 1, further comprising:
   generating, at the origin node, an origin node buffer for receiving and holding requests directed to the application and received at the origin node; and
   transmitting, from the origin node to the destination node and over the interim network nodes, the origin node buffer.

3. The method of claim 2, further comprising:
   generating, at the destination node, a destination node buffer for receiving and holding requests directed to the application and received at the destination node while the application migrates.

4. The method of claim 3, further comprising:
   merging, at the destination node, the origin node buffer into the destination node buffer.

5. The method of claim 4, wherein application requests of the merged origin node buffer and destination node buffer are ordered according to a time of receipt.

6. The method of claim 1, wherein updating the routing plane of the network comprises:

transmitting, from the origin node and to the destination node, one or more table entries for the application container;

merging, at the destination node, the one or more table entries for the application container into a table at the destination node;

transmitting, from the origin node and to a router, a flagged copy of a portion of the one or more table entries; and executing, at the router, at least one of a deletion of a router entry matching the flagged copy, an update of the router entry to refer to the destination node, or an addition of a new router entry comprising the flagged copy.

7. The method of claim 1, wherein the interest packet for the application container shares a routing plane and naming convention with one or more interest packets for services provided by an application corresponding to the application container.

8. A system comprising:
a hardware processor; and
a memory comprising instructions which, when executed by the hardware processor, cause the processor to:
receive, at an origin node from a destination node sent over an information centric network, an interest packet for an application container, the interest packet including a request for migrating the application container to the destination node and the information-centric network comprising one or more interim network nodes between the origin node and the destination node;
transmit, over the interim network nodes and to the destination node, a copy of the application container;
shut down, at the origin node, the application container;
transmit, over the interim network nodes and to the destination node, a remaining container state, the remaining container state including changes to a runtime of the application container occurring during transmission of the copy of the application container; and
update, by the destination node, a routing plane of the information-centric network for routing network traffic for the application container to the destination node.

9. The system of claim 8, the memory further comprising instructions that, when executed by the hardware processor, cause the processor to:
generate, at the origin node, an origin node buffer for receiving and holding requests directed to the application and received at the origin node; and
transmit, from the origin node to the destination node and over the interim network nodes, the origin node buffer.

10. The system of claim 9, the memory further comprising instructions that, when executed by the hardware processor, cause the processor to:
generate, at the destination node, a destination node buffer for receiving and holding requests directed to the application and received at the destination node while the application migrates.

11. The system of claim 10, the memory further comprising instructions that, when executed by the hardware processor, cause the processor to:
merge, at the destination node, the origin node buffer into the destination node buffer.

12. The system of claim 11, wherein application requests of the merged origin node buffer and destination node buffer are ordered according to a time of receipt.

13. The system of claim 8, wherein updating the routing plane of the network comprises:

transmitting, from the origin node and to the destination node, one or more table entries for the application container;

merging, at the destination node, the one or more table entries for the application container into a table at the destination node;

transmitting, from the origin node to a router, a flagged copy of a portion of the one or more table entries; and executing, at the router, one of a deletion of a router entry matching the flagged copy, an update of the router entry to refer to the destination node, or an addition of a new router entry comprising the flagged copy.

14. The system of claim 8, wherein the interest packet for the application container shares a routing plane and naming convention with one or more interest packets for services provided by an application corresponding to the application container.

15. A non-transitory computer readable medium comprising instructions that, when executed by a network device, causes the network device to:
receive, at an origin node from a destination node sent over an information centric network, an interest packet for an application container, the interest packet including a request for migrating the application container to the destination node and the information-centric network comprising one or more interim network nodes between the origin node and the destination node;
transmit, over the interim network nodes and to the destination node, a copy of the application container;
shut down, at the origin node, the application container;
transmit, over the interim network nodes and to the destination node, a remaining container state, the remaining container state including changes to a runtime of the application container occurring during transmission of the copy of the application container; and
update, by the destination node, a routing plane of the information-centric network for routing network traffic for the application container to the destination node.

16. The non-transitory computer readable medium of claim 15 further comprising instructions that, when executed by a network device, cause the network device to:
generate, at the origin node, an origin node buffer for receiving and holding requests directed to the application and received at the origin node; and
transmit, from the origin node to the destination node and over the interim network nodes, the origin node buffer.

17. The non-transitory computer readable medium of claim 16 further comprising instructions that, when executed by a network device, cause the network device to:
generate, at the destination node, a destination node buffer for receiving and holding requests directed to the application and received at the destination node while the application migrates.

18. The non-transitory computer readable medium of claim 17 further comprising instructions that, when executed by a network device, cause the network device to:
merge, at the destination node, the origin node buffer into the destination node buffer, the merged buffers ordered according to a time of receipt.

19. The non-transitory computer readable medium of claim 15, wherein the interest packet for the application container shares a routing plane and naming convention with one or more interest packets for services provided by an application corresponding to the application container.

20. The non-transitory computer readable medium of claim 15, wherein updating the routing plane of the network comprises:
- transmitting, from the origin node and to the destination node, one or more table entries for the application container;
- merging, at the destination node, the one or more table entries for the application container into a table at the destination node;
- transmitting, from the origin node to a router, a flagged copy of a portion of the one or more table entries; and
- executing, at the router, one of a deletion of a router entry matching the flagged copy, an update of the router entry to refer to the destination node, or an addition of a new router entry comprising the flagged copy.

* * * * *